(12) United States Patent
Nassir et al.

(10) Patent No.: US 11,170,494 B1
(45) Date of Patent: Nov. 9, 2021

(54) SMART METHOD AND APPARATUS FOR SMART DULL GRADING AND MODIFICATION IDENTIFICATION

(71) Applicant: Saudi Arabian Oil Company, Dhahran (SA)

(72) Inventors: Alawi Al Alsayed Nassir, An Nassirah (SA); Ossama R. Sehsah, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 49 days.

(21) Appl. No.: 16/869,259

(22) Filed: May 7, 2020

(51) Int. Cl.
*G06T 5/00* (2006.01)
*G06T 7/00* (2017.01)
*G06T 7/55* (2017.01)

(52) U.S. Cl.
CPC .......... *G06T 7/0004* (2013.01); *G06T 7/55* (2017.01); *G06T 2200/04* (2013.01); *G06T 2207/30164* (2013.01)

(58) Field of Classification Search
CPC ........... G06T 9/001; G06T 5/00; G06T 7/001; G06T 7/30; H04N 19/176; H04N 19/597; E21B 12/02; G06K 9/00624; G01N 21/95; G01N 21/8851; B23Q 17/0995
See application file for complete search history.

(56) References Cited

U.S. PATENT DOCUMENTS

2017/0235848 A1* 8/2017 Van Dusen ............ G06F 16/904
705/12

2019/0030673 A1 1/2019 Pereira
2019/0145183 A1* 5/2019 Potash .................. G06K 9/00
700/175

FOREIGN PATENT DOCUMENTS

CN 102187047 12/2014
EP 3284900 2/2018

OTHER PUBLICATIONS

PCT International Search Report and Written Opinion in International Appln. No. PCT/US2021/030800, dated Jul. 27, 2021, 13 pages.

* cited by examiner

*Primary Examiner* — Phuoc H Doan
(74) *Attorney, Agent, or Firm* — Fish & Richardson P.C.

(57) ABSTRACT

Systems and methods include a computer-implemented method for automating product inspection processes. A product is scanned using multiple scans obtained from different angles. A 3D numerical model of the product is generated. The 3D numerical model is compared to 3D product specification models, each numerically defining specifications for a given product in new condition. The 3D numerical model is matched to a matched 3D product specification model. A product type of the product is determined. A report is generated based on comparisons of the 3D numerical model and the matched 3D product specification model. For a new product, the report includes an indication of whether the new product matches design specifications for new products of the product type. For a used product, the report includes an indication of a used condition of the used product relative to a new condition of new products of the product type.

20 Claims, 10 Drawing Sheets

SMART METHOD AND APPARATUS FOR SMART DULL GRADING AND MODIFICATION IDENTIFICATION

BACKGROUND

The present disclosure applies to grading products, for example, bits that are used for drilling into the ground or earth. The bits can be used, for example, when drilling for oil, water, or gas, or when drilling for mines. Dull bit grading techniques can be used to grade bits to help in understanding and tracking bit performance. Conventional grading techniques can rely on the use of grading codes associated with worn or damaged bits. Understanding the meaning of certain grading codes can be challenging, especially for personnel who have never seen the corresponding dull characteristics before. New oil field personnel, for example, may have difficulty in learning the correct ways to perform bit grading.

SUMMARY

The present disclosure describes techniques that can be used for automating product inspection processes, for example, including processes for inspecting new bits for design compliance and inspecting used bits for wear. The bits can be used in the petroleum industry, for example. In some implementations, a computer-implemented method includes the following. A product is scanned using multiple scans obtained from different angles relative to the product. A 3D numerical model of the product is generated using feature recognition and the multiple scans. The 3D numerical model of the product is compared to 3D product specification models, where each 3D product specification model numerically defines specifications for a given product in new condition. The 3D numerical model is matched to a matched 3D product specification model. A product type of the product that is scanned is determined based on the matching. A report is generated based on a comparison of the 3D numerical model of the product and the matched 3D product specification model. For a new product that is scanned, the report includes an indication of whether the new product matches design specifications for new products of the product type. For a used product that is scanned, the report includes an indication of a used condition of the used product relative to a new condition of new products of the product type.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. First, techniques of the present disclosure can be used to improve compliance of used and newly-manufactured products (for example, verifying compliance of bit design). Second, product inspection processes, including related to drilling and workover operations, can be improved and made more efficient. Third, automated techniques can replace manual techniques and tools for similar products (for example, bits) identification and inspection reports. Fourth, automated techniques can be used for determining life (remaining) percentages of products. Fifth, changes to supplied products in new or used condition can be identified for auditing purposes. Sixth, costs and time associated with manual inspection can be reduced. Seventh, automatic data base updates can occur to track product inventory. Eighth, costs can be saved by eliminating the subjectivity of processes, for example, International Association of Drilling Contractors (IADC) inspections. These inspections are typically visual and manual processes, with inconsistent results, even when following IADC guidelines.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

Figure 1:
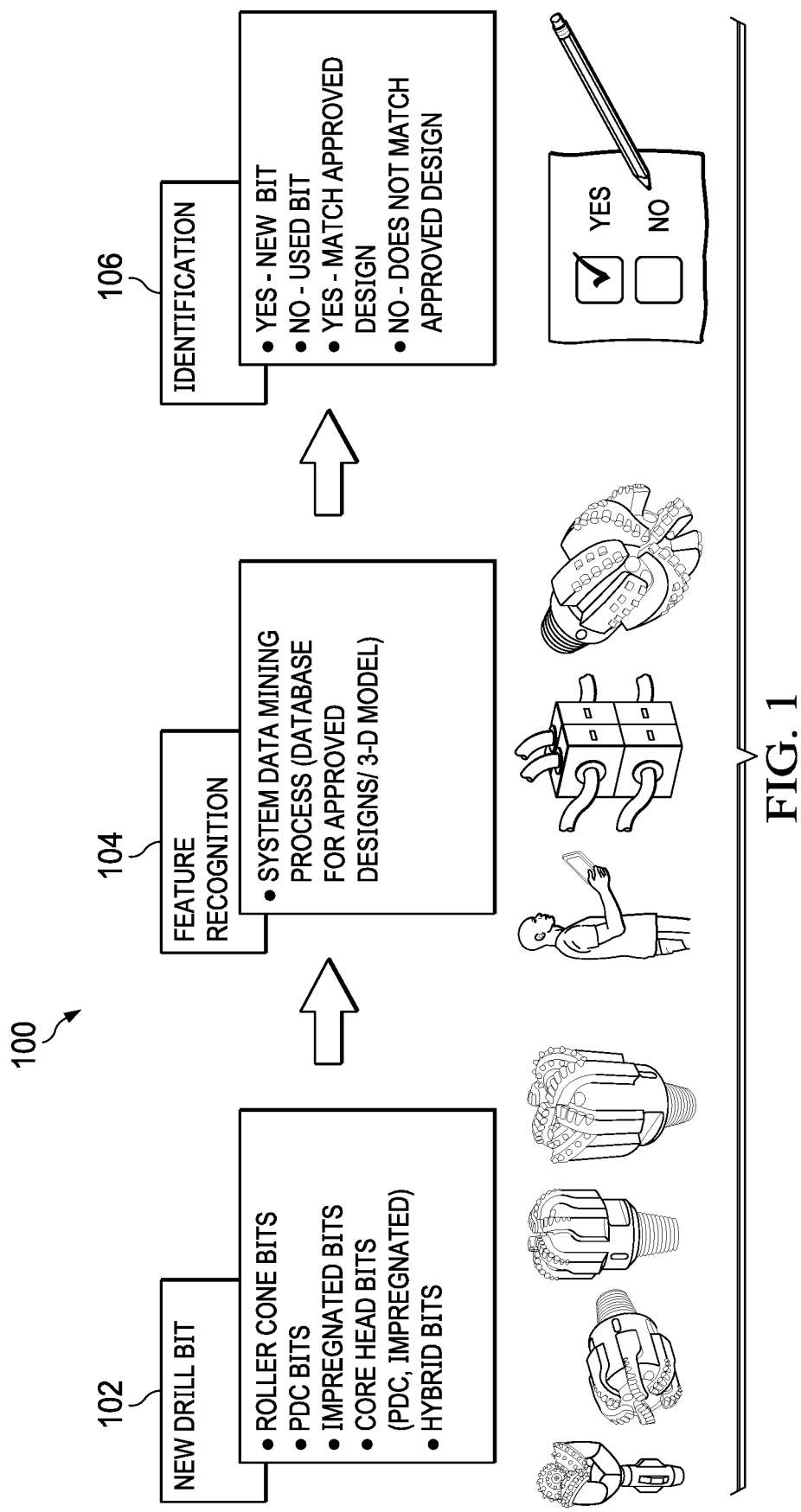
FIG. 1 is a flow diagram of an example of a workflow for identifying new bits, according to some implementations of the present disclosure.

The following detailed description describes techniques for automating product inspection processes. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

In some implementations, a smart feature recognition system (or "system") can be used to automate processes used to trace, track, and identify modifications or changes to a standard product design. The system can be used to validate and verify newly-manufactured product and used product. As an example, drilling operators and engineers can use the system to dull-grade used drill bits. Bits can include, for example, roller cone (RC) bits (insert type and steel tooth type), fixed cutter bits (polycrystalline diamond compact (PDC) bits including matrix body PDC bits and steel body PDC bits), impregnated bits, core heads, and hybrid bits (for example, incorporating both PDC and roller cone bits). The system can also be used to classify inspected products as re-runnable, repairable, or unusable (for example, "junk") based on defined criteria. The system can estimate and provide a re-runnable product's life percentage based on calibration specifications and processes for each bit type. The system can use three-dimensional (3D) feature recognition to assess the condition of external and internal components of a product's body and its parts. For example, the system can be used in drill bit 3D feature recognition, automatic drill bit inspection reporting, and automatic drill bit design modification (including cutter technology). Feature recognition and the techniques described in the present disclosure can be used in oil and gas applications and in other industries.

In some implementations, the system can be used for automation and real-time measurement of product conditions. For example, the term real-time can correspond to events that occur within a specified period of time, such as within a few seconds or a few minutes. Applications that are developed can be used with in-house devices/systems to generate product repair reports (for example, bit repair reports). The reports can be used proactively to prevent problems associated with damaged and worn products. Algorithms can be developed that can analyze repair/replace economics, such as to use pre-defined criteria to identify when replacement is more cost-effective than product repair. Applications can also be used to generate product compliance and identification reports for each product, such as for auditing purposes.

The system can be used to identify unreported design modifications or changes. The identification can be linked to approved/standard product designs and modified designs. In addition, the system can perform product inspection by comparing new product conditions for certain product types (for example, bit types). As an example, the system can use International Association of Drilling Contractors (IADC) dull grading standards for roller cones, PDC bits, and impregnated bits to dull grade bits and to generate a complete bit dull grading report for each scanned bit.

In some implementations, techniques used for validating/confirming product design and features can be based on product specification sheets and 3D models. For example, the system can generate a 3D model for each product and store the information in a numerical model data base. The system can correlate similarities and differences/variations from standards or specifications as numeric values. Then, the system can determine variances by calculating numerical differences between a 3D model generated for a used or new product and the 3D-defined and stored model for the product in new condition. Differences included in the determined variances can be presented in an IADC inspection form. In the case of a new bit, for example, the system can compare a generated model of the new bit to a stored 3D model of the corresponding approved bit stored in the system. In this way, the system can confirm that both models match, meaning that a newly-manufactured bit matches defined specifications.

In some implementations, the system can include processes for identifying new products from used products. The system can also include inspection processes, for example, to automatically dull grade used bits (including PDC bits, roller cones, impregnated bits, core heads, and hybrid bits). In some implementations, equipment that is coupled with a bit inspection system can include a scanner and box for scanning area large enough to accommodate various product sizes (for example, bits of 22-34 inches). Equipment can also include fixed cameras/lenses capable of generating 3D models. In some implementations, equipment can include moving robots that can scan or take photos of a product.

In some implementations, processes for dull grading and classification can include determining a life percentage of a product. For example, a remaining life of 80% can be determined, as compared to a new product's condition and expected life. The remaining life can be determined based on factors such as how much wear currently exists, for example, on the bit's cutting structure and the bit's overall body condition when compared to the condition of a new bit. In some implementations, remaining life can be based on historical data analysis that considers the field, application, and drilling conditions in which the product is used. For example, the remaining life of a bit can vary depending on whether the bit is used on a rotary steerable system (RSS) or motor, a turbine, or a conventional bottomhole assembly (BHA). The determination of remaining life can use information from a database and a look-up system that is designed to recognize any product based, for example, on a manufacturer name and a part number. The database can be customized to fit interested customers and their internal systems, linking the customers' internal systems to the system database.

For a bit being inspected, the system can generate a numerical 3D model and compare the numerical 3D model to a stored model in the data base. User interfaces can be used to present a report on the results of the inspection. Information presented to a user can include an IADC inspection report and additional information, including compliance information and bit condition class (for example, re-runnable, repairable, or junk). If the bit is classified as re-runnable, a life percentage figure can be generated for the bit. If the bit is classified as repairable, then the inspection report can provide specific details describing repairs to be completed to restore the bit to have sharp cutting structures as if in like-new condition. Classification of a bit as junk can indicate that the bit is damaged behind repair. Specific portions of junk-classified bits can be identified as including materials suitable for recycling, or cutters suitable to be reclaimed for repair, for testing, or for other purposes.

The 3D design of bits can be represented and stored in a system database that supports the performance of 3D feature recognition on any product. At the completion of 3D feature recognition, the system can generate a product identification report that shows if the product is classified as approved or not. If the product meets approval, then the system can generate a product specification sheet which can be attached to the product identification report. If the product does not meet approval, then the system can generate an identification report that includes a product specifications sheet and includes a summary describing the differences between the unapproved product and the product specifications.

The 3D feature recognition capabilities of the system can be used to identify a product and to generate a product inspection report based on IADC dull grading standards. As an example, the report that is generated can depend on a bit type (for example, roller cone, PDC, impregnated, core head, or hybrid products). Used bits that are inspected can be classified as re-runnable, repairable, or junk. For a re-runnable bit (for example, for a PDC bit or an impregnated bit), a life percentage can be determined that is based on how much wear remains on the bit. If the bit is a roller cone bit, then the system can determine a life percentage for the bit based on the cutting structure and an estimated bearing/seal life. In some cases, user inputs for a bit's working hours can be used in calculating an estimated number of thousands of revolutions (Krev) in order to determine the expected life percentage of an RC bit. In addition, the inspection report for a bit that is classified as repairable can describe specific repairs to the bit that are required to return the bit to like new condition. The specific repair (for example, cutter replacement, cutter rotation, depth of cut element, nozzles) can also be identified. When an inspection report classifies a bit as junk, the report can explain the reasons(s) for the classification based on pre-defined criteria for each bit or part number. For instance, pre-defined criteria can indicate that a crack has been detected in a bit body or sever impact damage has been detected in a pocket of the cutting elements.

The system can generate numerical models (for example, 3D models) for any product that is scanned, whether the product is used or new. As an example, the numerical models can be compared to stored models, and an IADC inspection report can be generated. The report can be based on a stored model that indicates a match with the bit being scanned. The report can classify the bit as re-runnable, repairable, or junk based on defined conditions. If the bit is classified as repairable, then the system can generate a report indicating repairs are that are needed to bring the product back to like new condition (for example, with a sharp cutting structure). Repairs can include, for example, replacement of damaged cutters, replacement of rotating cutters having a certain amount of wear, replacement of hard facing for steel PDC bits, and upper section replacement if required (for example, for API connections).

FIG. 1 is a flow diagram of an example of a workflow 100 for identifying new bits, according to some implementations of the present disclosure. In some implementations, the workflow 100 can be used for identifying products in general. At 102, a new drill bit is examined. Examining the drill bit can include scanning the drill bit to create a 3D model of the drill bit. At 104, feature recognition is performed. For example, system data mining can be performed that uses a database of approved designs represented as 3D models. At 106, identification of the new drill bit is made, such as comparing the 3D model of the new bit to a stored 3D model associated with an approved bit's specifications. Identification can include findings such as: the bit is a new bit, the bit is a used bit, the bit is new and matches an approved design, or the new bit does not match an approved design.

Figure 2:
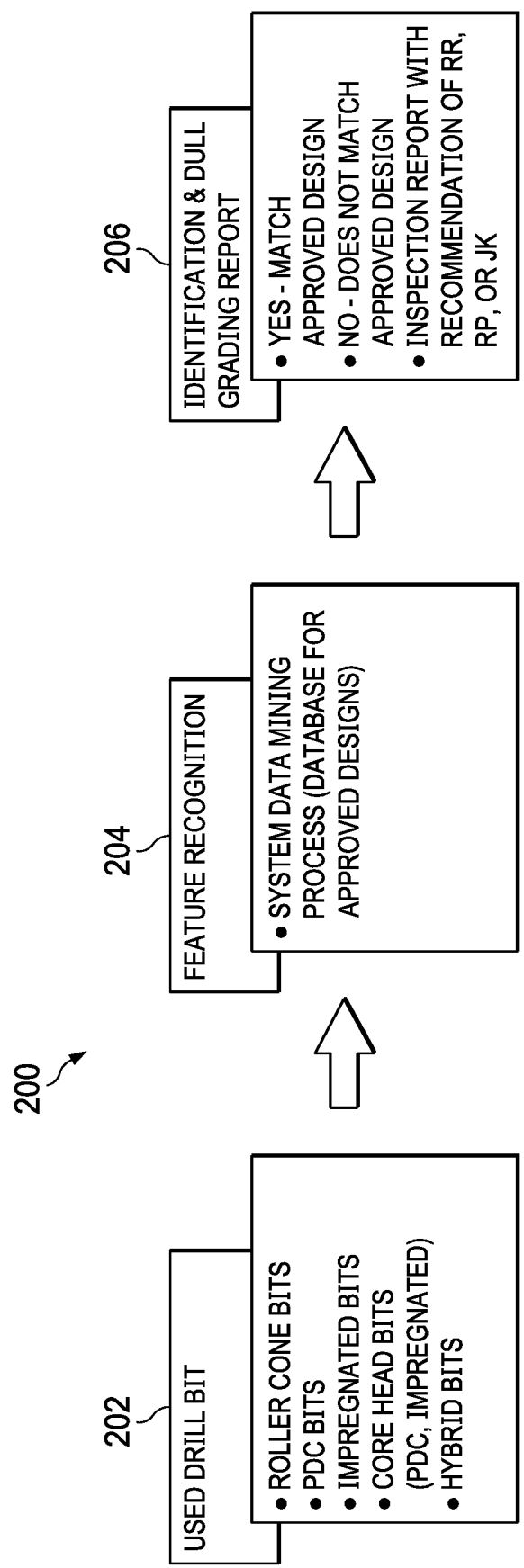
FIG. 2 is a flow diagram of an example of a workflow for dull grading new bits, according to some implementations of the present disclosure.
Figure 3A:
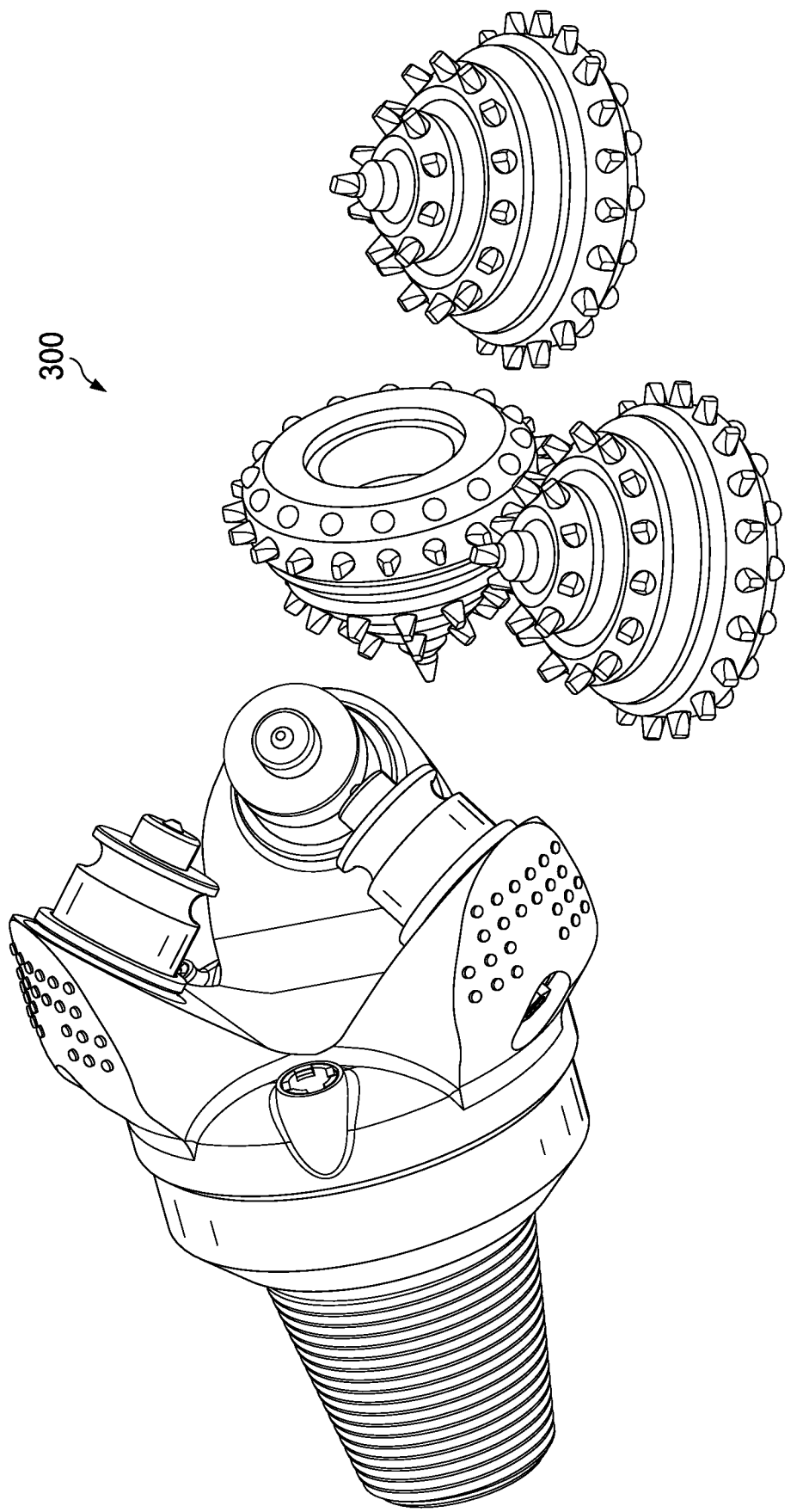
FIGS. 3A-3F are diagrams showing examples of drill bits that can be identified and dull graded using techniques of the present disclosure, according to some implementations of the present disclosure.
Figure 3B:
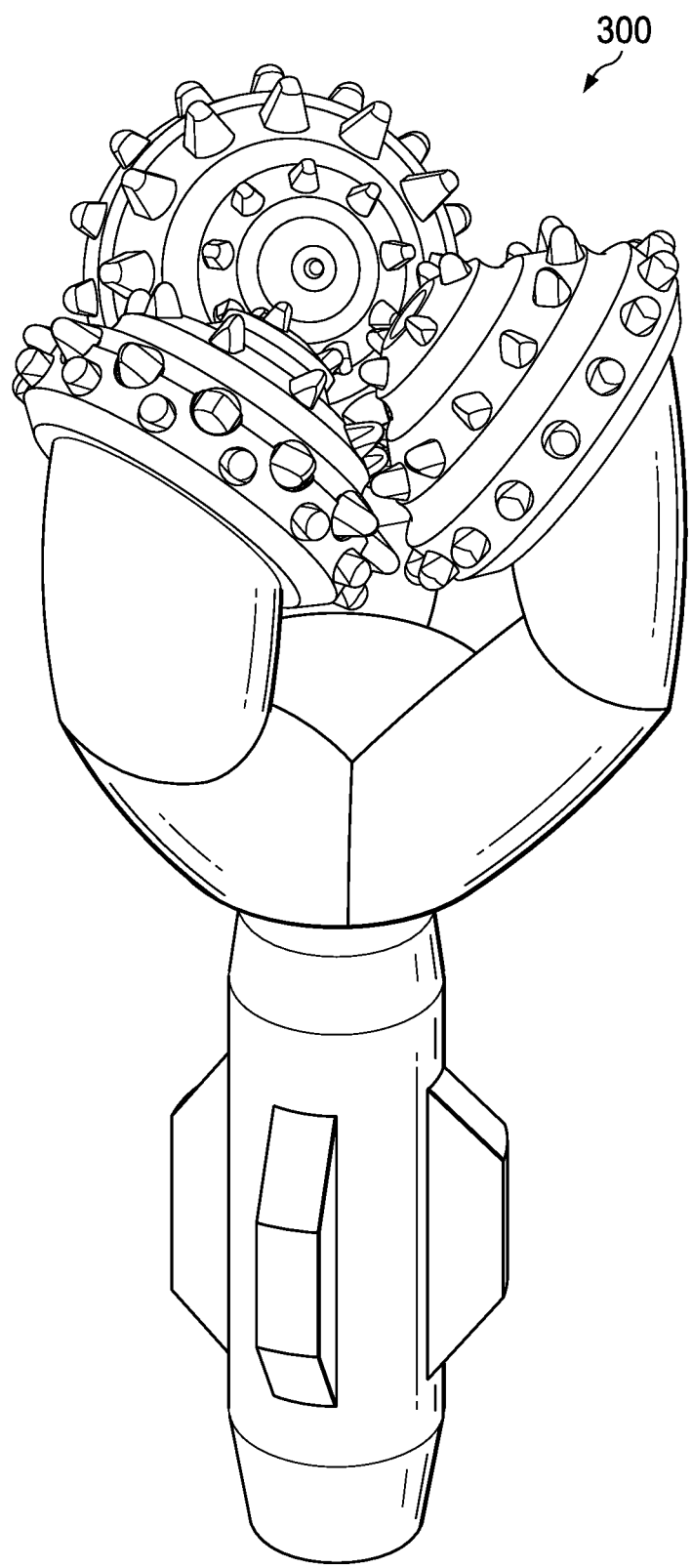
Figure 3C:
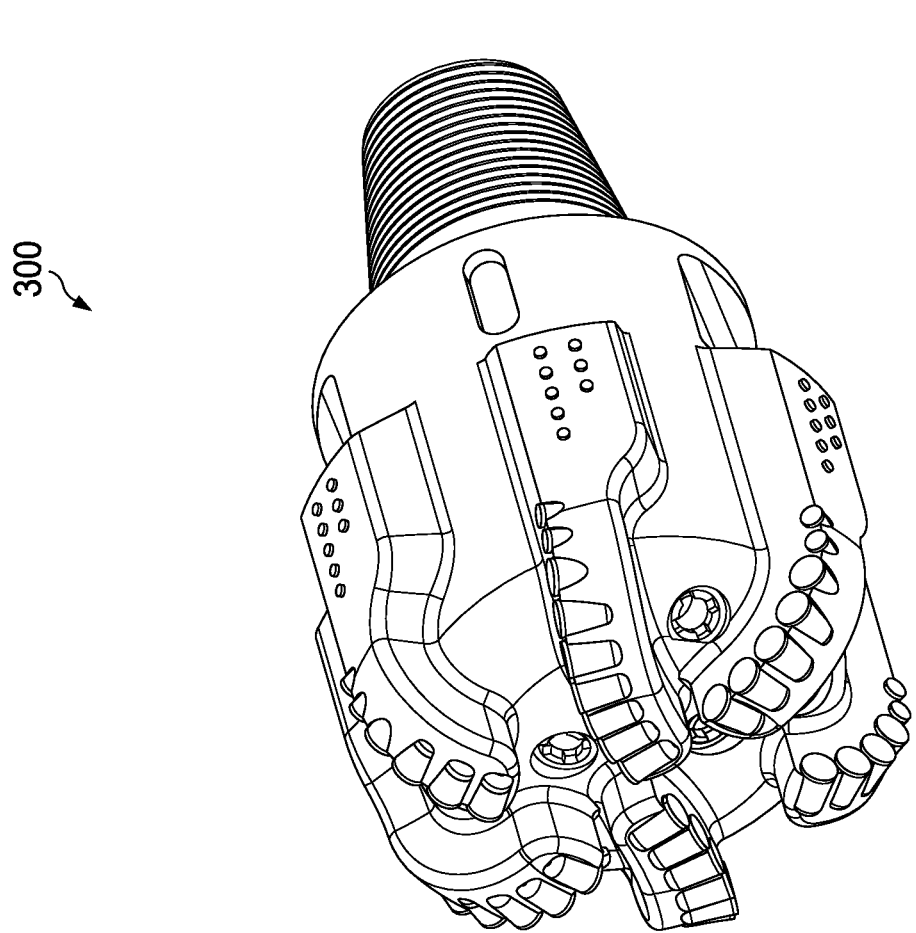
Figure 3C:
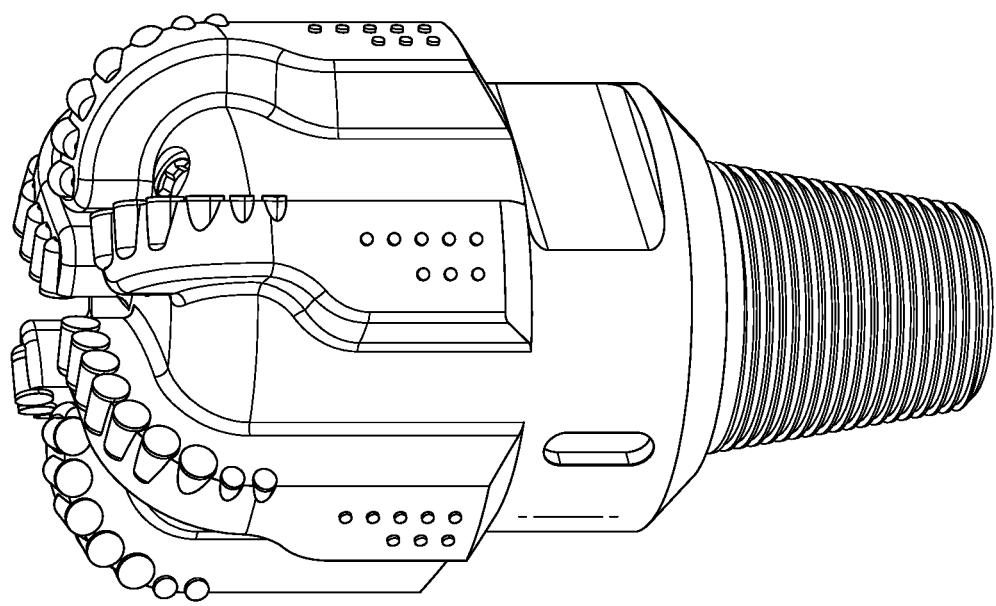
Figure 3D:
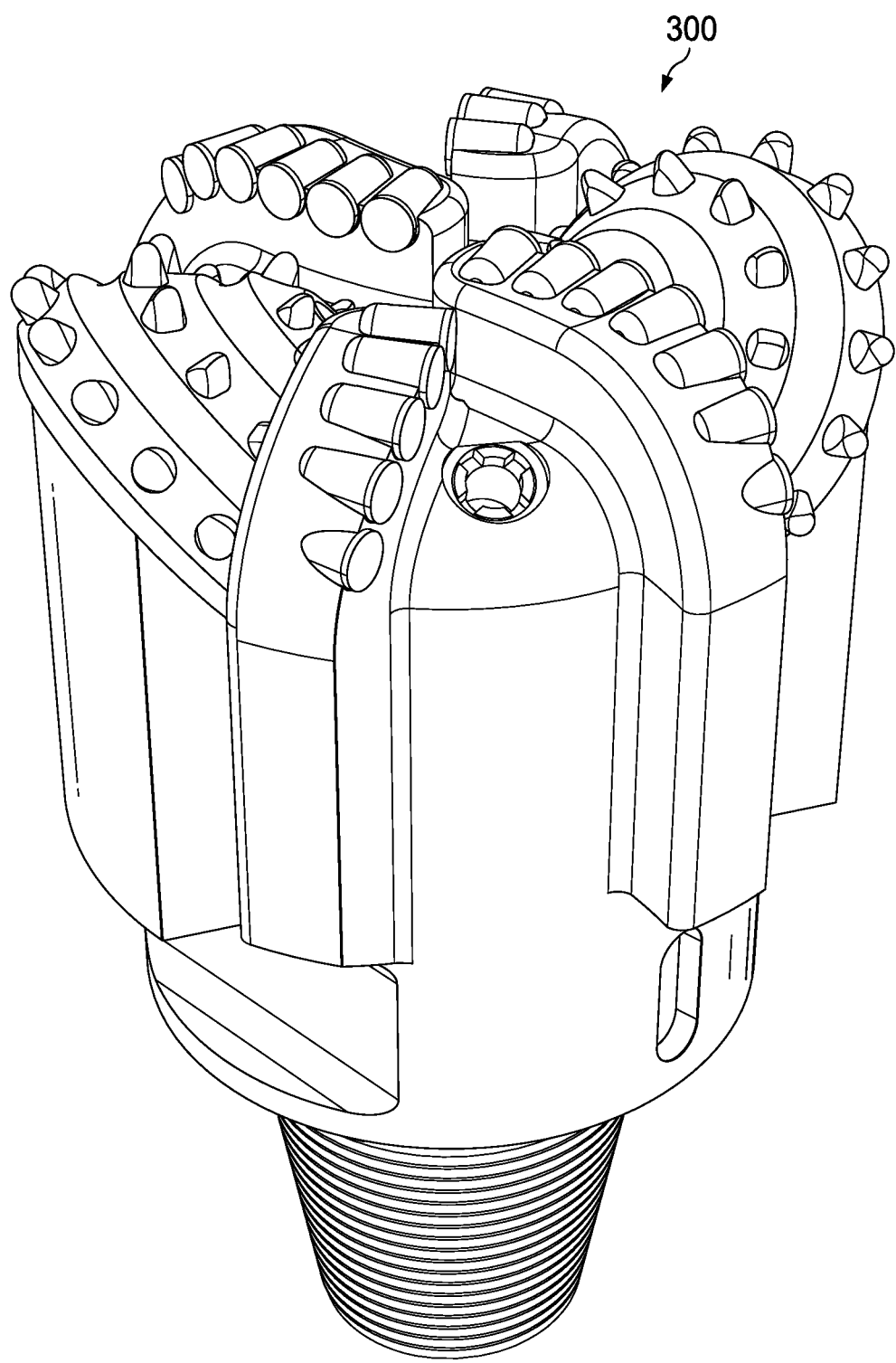
Figure 3E:
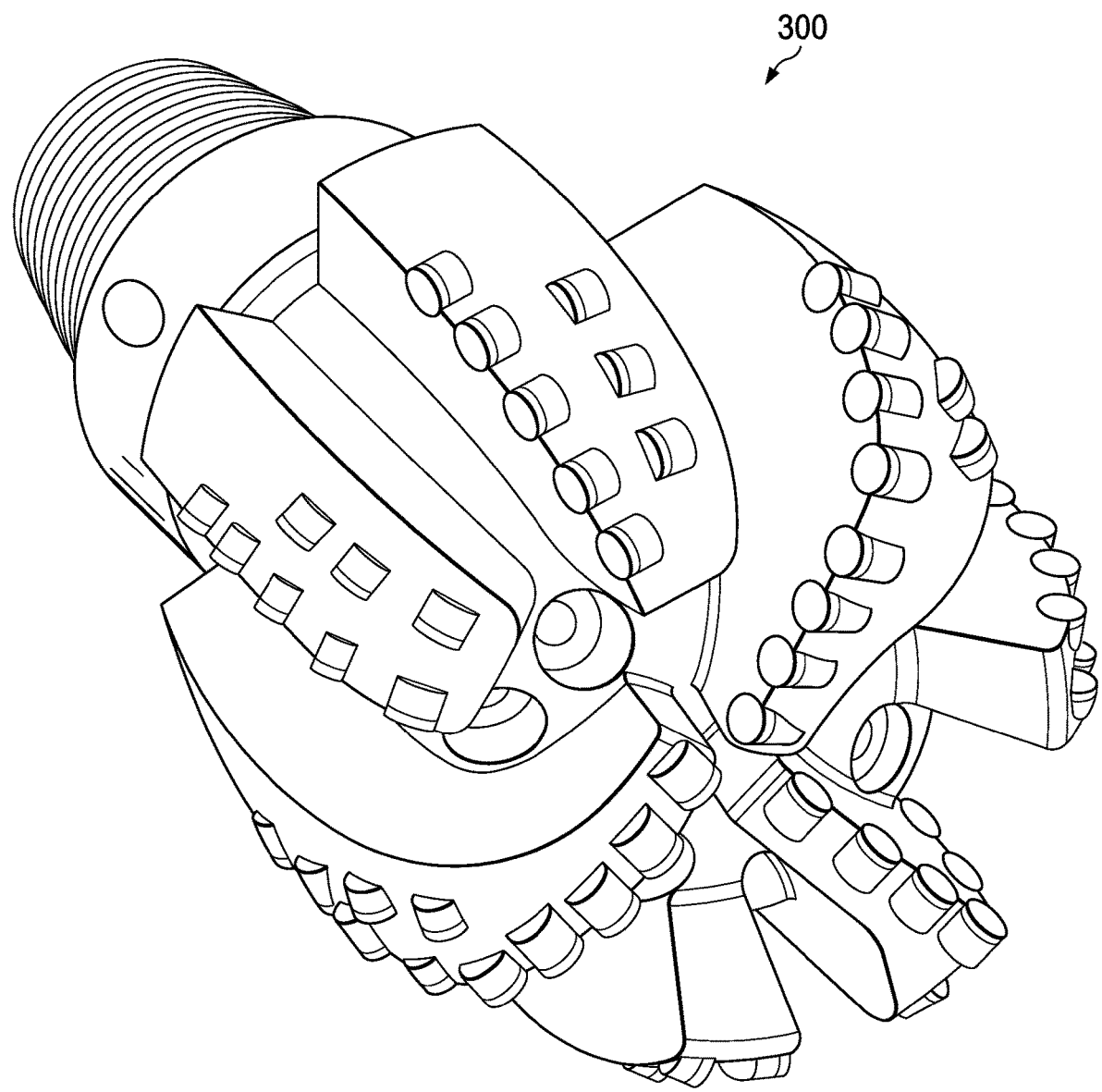
Figure 3F:
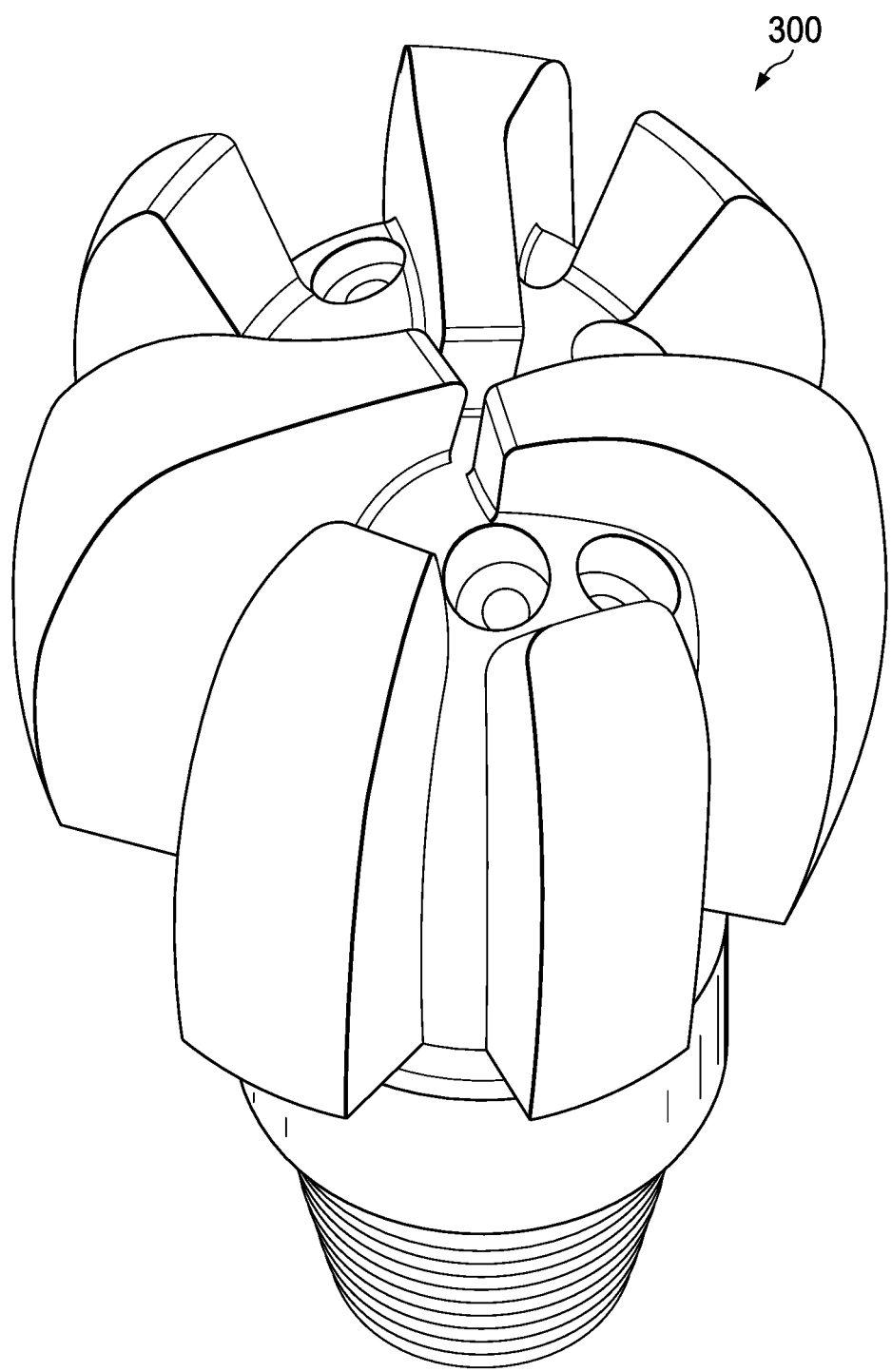

FIG. 2 is a flow diagram of an example of a workflow 200 for dull grading new bits, according to some implementations of the present disclosure. In some implementations, the workflow 200 can be used for condition grading products in general. At 202, a used drill bit is examined. Examining the drill bit can include scanning the drill bit to create a 3D model of the drill bit. At 204, feature recognition is performed. For example, system data mining can be performed that uses a database of approved designs represented as 3D models. At 206, identification and dull grading of the used drill bit is performed, such as comparing the 3D model of the used bit to a stored 3D model associated with an approved bit's specifications. Identification can include findings such as: the bit is new and matches an approved design, or the bit does not match an approved design. An inspection report can be generated that includes a recommendation such as re-runnable (RR), repairable (RP), or junk (JK).

FIGS. 3A-3F are diagrams showing examples of drill bits 300 that can be identified and dull graded using techniques of the present disclosure, according to some implementations of the present disclosure. The drill bits 300 represent a subset of drill bits that can be used, for example, when drilling for oil, water, or gas, or when drilling for mines.

Figure 4:
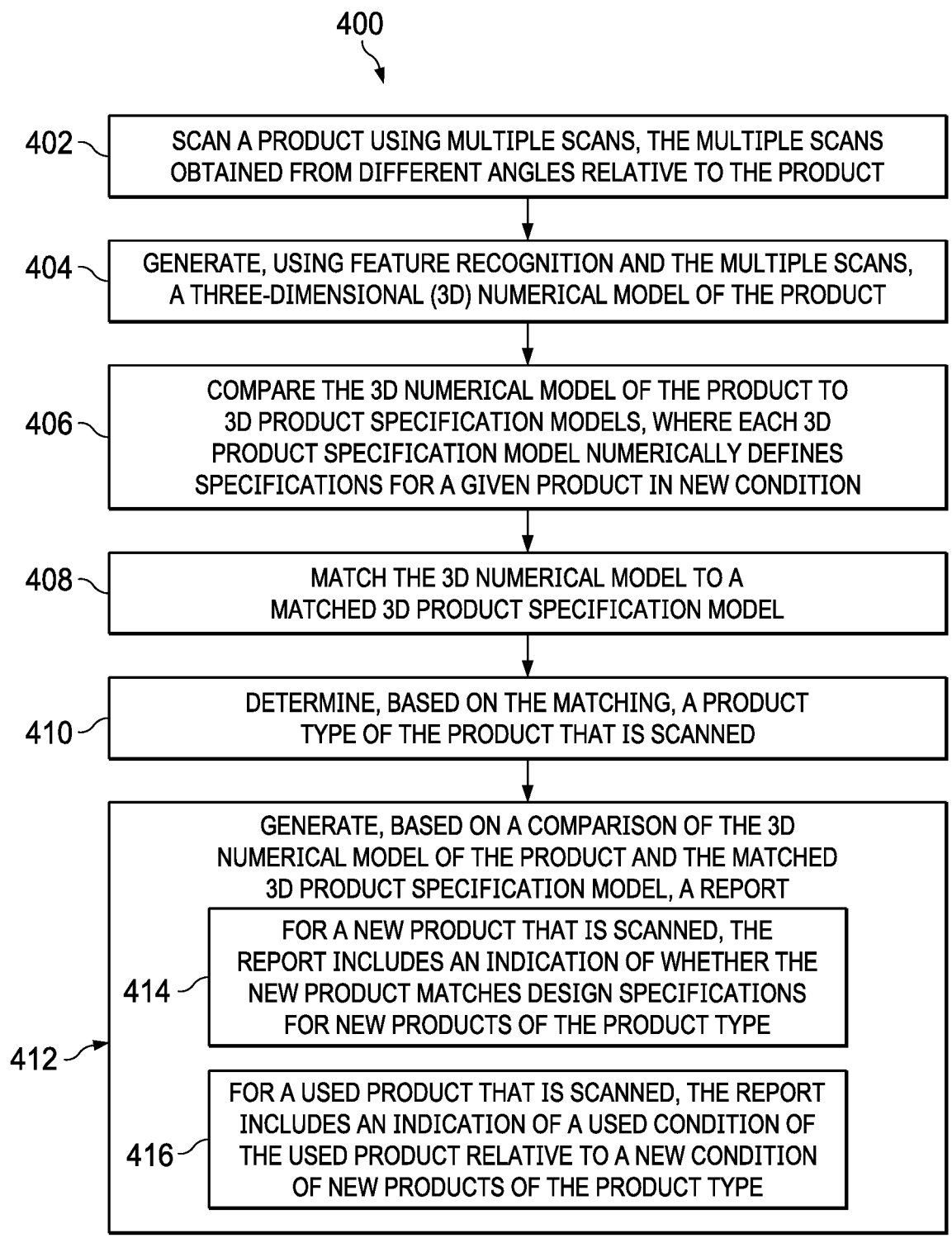
FIG. 4 is a flowchart of an example of a method for automating product inspection processes, according to some implementations of the present disclosure.

FIG. 4 is a flowchart of an example of a method 400 for automating product inspection processes, according to some implementations of the present disclosure. For clarity of presentation, the description that follows generally describes method 400 in the context of the other figures in this description. However, it will be understood that method 400 can be performed, for example, by any suitable system, environment, software, and hardware, or a combination of systems, environments, software, and hardware, as appropriate. In some implementations, various steps of method 400 can be run in parallel, in combination, in loops, or in any order.

At 402, a product is scanned using multiple scans of the product obtained from different angles relative to the product. As an example, the product can be a drill bit used for oil, water, or gas drilling, or when drilling for mines. The scans can be obtained from multiple scanners positioned at various locations around the product. A product to be scanned can be placed in a box or in a scanning area. In some implementations, scanning can occur using a conveyor belt that carries products to be scanned past the multiple scanners. From 402, method 400 proceeds to 404.

At 404, a 3D numerical model of the product is generated using feature recognition and the multiple scans. The 3D numerical model of the product can include numerical measurements of points, edges, and faces of the product. From 404, method 400 proceeds to 406.

At 406, the 3D numerical model of the product is compared to 3D product specification models, where each 3D product specification model numerically defines specifications for a given product in new condition that are stored in a product specification model database. For example, for a product being scanned, the 3D numerical model of the product obtained by scanning can compared to 3D product specification models of previously-identified products. The database can include entries of all drill bits that can be used at an oil facility, for example. From 406, method 400 proceeds to 408.

At 408, the 3D numerical model is matched to a matched 3D product specification model. For example, mathematical model information for the shape of a scanned drill bit can be compared to mathematical model information of known drill bits in new condition that are stored in the product specification model database. From 408, method 400 proceeds to 410.

At 410, a product type of the product that is scanned is determined based on the matching. As an example, scanning a drill bit can result in identifying the drill bit of being of type ABC (for example, as indicated by part number) manufactured by Company XYZ. From 410, method 400 proceeds to 412.

At 412, a report is generated based on a comparison of the 3D numerical model of the product and the matched 3D product specification model. For example, for a new product that is scanned, the report can include an indication of whether the new product matches design specifications for new products of the product type. For a used product that is scanned, the report can include an indication of a used condition of the used product relative to a new condition of new products of the product type. After 412, method 400 can stop.

In some implementations, method 400 further includes steps for dull grading the product. For example, for a used product that is scanned, a determination can be made that the product is a drill bit. Then, a dull grading of the drill bit can be performed to determine a wear classification of the drill bit (for example, re-runnable, repairable, and unusable (or "junk"). In some implementations, dull grading can determine (and report on) features such as inner cutting structure condition, outer cutting structure condition, dull characteristics (for example, broken teeth), location of wear and damage on a bit (for example, specific row or cone), the life remaining on non-sealed bearings, the seal condition on sealed bearings, gauge variations (for example, in gauge versus a measured distance out-of-gauge), and a specific reason that a bit is pulled or a run terminated. Reports can list codes that are consistent with codes used in IADC dull grading. Reports can be produced as a printed report, an online report (for example, available through a graphical user interface), or both. Data from reports can used to automatically update inventory, for example, to identify the number of drill bits of certain types that are available. Automated dull grading can replace manual processes such as using nominal size ring gauges to measure gaps heights of teeth and cones. In some implementations, similar dull grading can be used for fixed cutters.

In some implementations, for a product for which the wear classification is re-runnable, estimating and providing a life percentage of the product can be based on calibration specifications. For a product for which the wear classification is repairable, the system can generate an inspection report providing specific details describing repairs to be completed to restore the product to like-new condition. For a product for which the wear classification is unusable, the system can generate a recycling report identifying specific portions of the product that include materials suitable for one or more of recycling, reclaiming for repair, or testing.

In some implementations, method 400 further includes generating an IADC inspection report for the used product. The IADC inspection report can be based on dull grading standards for drill bits. In some implementations, method 400 further includes validating a product design and features of the product based on product specification sheets and 3D models specifying a manufacture of the product. In some implementations, method 400 further includes determining a product type of a new product by comparing a 3D numerical model of the new product to a 3D numerical model of an existing worn product of a known type.

Figure 5:
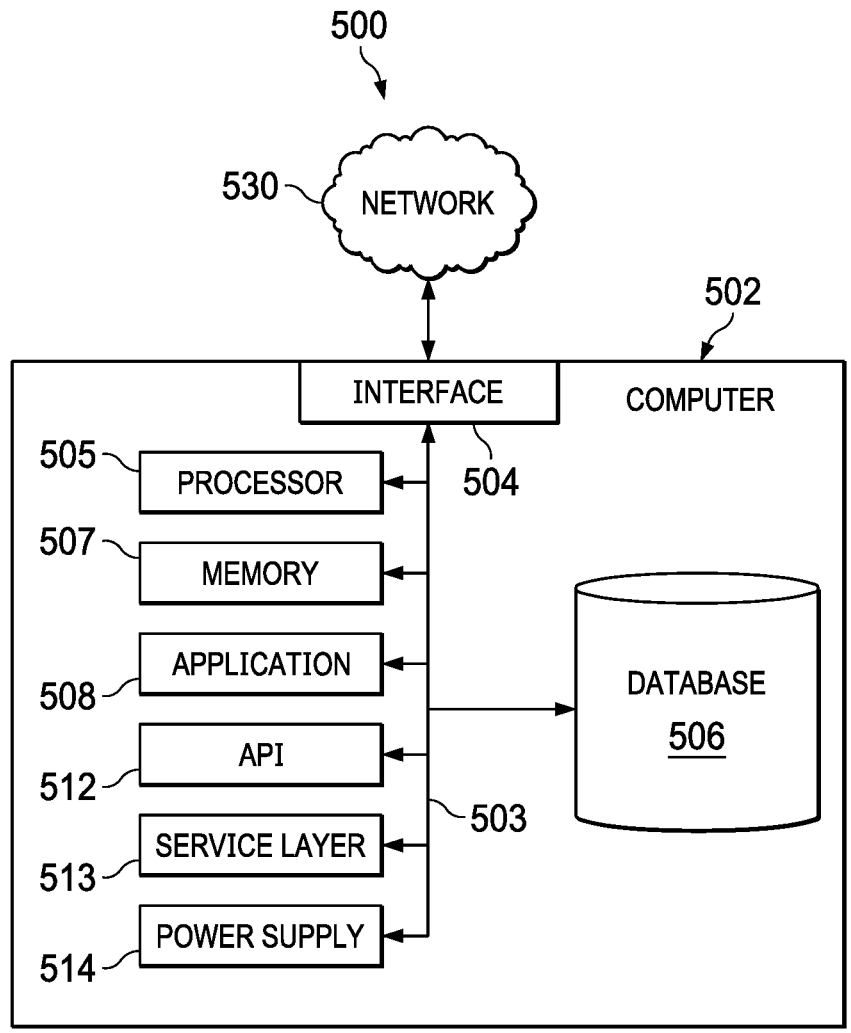
FIG. 5 is a block diagram illustrating an example computer system used to provide computational functionalities associated with described algorithms, methods, functions, processes, flows, and procedures as described in the present disclosure, according to some implementations of the present disclosure.

FIG. 5 is a block diagram of an example computer system 500 used to provide computational functionalities associated with described algorithms, methods, functions, processes, flows, and procedures described in the present disclosure, according to some implementations of the present disclosure. The illustrated computer 502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI).

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a top level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 504 (or a combination of both) over the system bus 503. Interfaces can use an application programming interface (API) 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs.

The service layer 513 can provide software services to the computer 502 and other components (whether illustrated or not) that are communicably coupled to the computer 502. The functionality of the computer 502 can be accessible for all service consumers using this service layer. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 5, two or more processors 505 can be used according to particular needs, desires, or particular implementations of the computer 502 and the described functionality. Generally, the processor 505 can execute instructions and can manipulate data to perform the operations of the computer 502, including operations using algorithms, methods, functions, processes, flows, and procedures as described in the present disclosure.

The computer 502 also includes a database 506 that can hold data for the computer 502 and other components connected to the network 530 (whether illustrated or not). For example, database 506 can be an in-memory, conventional, or a database storing data consistent with the present disclosure. In some implementations, database 506 can be a combination of two or more different database types (for example, hybrid in-memory and conventional databases) according to particular needs, desires, or particular implementations of the computer 502 and the described functionality. Although illustrated as a single database 506 in FIG. 5, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 (of the same, different, or combination of types) can be used according to particular needs, desires, or particular implementations of the computer 502 and the described functionality. While memory 507 is illustrated as an internal component of the computer 502, in alternative implementations, memory 507 can be external to the computer 502.

The application 508 can be an algorithmic software engine providing functionality according to particular needs, desires, or particular implementations of the computer 502 and the described functionality. For example, application 508 can serve as one or more components, modules, or applications. Further, although illustrated as a single application 508, the application 508 can be implemented as multiple applications 508 on the computer 502. In addition, although illustrated as internal to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power-supply 514 can include a power plug to allow the computer 502 to be plugged into a wall socket or a power source to, for example, power the computer 502 or recharge a rechargeable battery.

There can be any number of computers 502 associated with, or external to, a computer system containing computer 502, with each computer 502 communicating over network 530. Further, the terms "client," "user," and other appropriate terminology can be used interchangeably, as appropriate, without departing from the scope of the present disclosure. Moreover, the present disclosure contemplates that many users can use one computer 502 and one user can use multiple computers 502.

Described implementations of the subject matter can include one or more features, alone or in combination.

For example, in a first implementation, a computer-implemented method includes the following. A product is scanned using multiple scans obtained from different angles relative to the product. A 3D numerical model of the product is generated using feature recognition and the multiple scans. The 3D numerical model of the product is compared to 3D product specification models, where each 3D product specification model numerically defines specifications for a given product in new condition. The 3D numerical model is matched to a matched 3D product specification model. A product type of the product that is scanned is determined based on the matching. A report is generated based on a comparison of the 3D numerical model of the product and the matched 3D product specification model. For a new product that is scanned, the report includes an indication of whether the new product matches design specifications for new products of the product type. For a used product that is scanned, the report includes an indication of a used condition of the used product relative to a new condition of new products of the product type.

The foregoing and other described implementations can each, optionally, include one or more of the following features:

A first feature, combinable with any of the following features, the method further including determining a product type of a new product by comparing a 3D numerical model of the new product to a 3D numerical model of an existing worn product of a known type.

A second feature, combinable with any of the previous or following features, where the product is a drill bit used for drilling for oil, water, or gas, or when drilling for mines.

A third feature, combinable with any of the previous or following features, the method further including, for the used product that is scanned: determining that the product is a drill bit; and performing a dull grading of the drill bit to determine a wear classification of the drill bit, where the wear classification is re-runnable, repairable, or unusable.

A fourth feature, combinable with any of the previous or following features, the method further including: for a product for which the wear classification is re-runnable, estimating and providing a life percentage of the product based on calibration specifications; for a product for which the wear classification is repairable, generating an inspection report providing specific details describing repairs to be completed to restore the product to like-new condition; and for a product for which the wear classification is unusable, generating a recycling report identifying specific portions of the product that include materials suitable for one or more of recycling, reclaiming for repair, for testing.

A fifth feature, combinable with any of the previous or following features, the method further including generating an International Association of Drilling Contractors (IADC)

inspection report for the used product, the IADC inspection report based on dull grading standards for drill bits.

A sixth feature, combinable with any of the previous or following features, the method further including validating a product design and features of the product based on product specification sheets and 3D models specifying a manufacture of the product.

In a second implementation, a non-transitory, computer-readable medium stores one or more instructions executable by a computer system to perform operations including the following. A product is scanned using multiple scans obtained from different angles relative to the product. A 3D numerical model of the product is generated using feature recognition and the multiple scans. The 3D numerical model of the product is compared to 3D product specification models, where each 3D product specification model numerically defines specifications for a given product in new condition. The 3D numerical model is matched to a matched 3D product specification model. A product type of the product that is scanned is determined based on the matching. A report is generated based on a comparison of the 3D numerical model of the product and the matched 3D product specification model. For a new product that is scanned, the report includes an indication of whether the new product matches design specifications for new products of the product type. For a used product that is scanned, the report includes an indication of a used condition of the used product relative to a new condition of new products of the product type.

The foregoing and other described implementations can each, optionally, include one or more of the following features:

A first feature, combinable with any of the following features, the operations further including determining a product type of a new product by comparing a 3D numerical model of the new product to a 3D numerical model of an existing worn product of a known type.

A second feature, combinable with any of the previous or following features, where the product is a drill bit used for drilling for oil, water, or gas, or when drilling for mines.

A third feature, combinable with any of the previous or following features, the operations further including, for the used product that is scanned: determining that the product is a drill bit; and performing a dull grading of the drill bit to determine a wear classification of the drill bit, where the wear classification is re-runnable, repairable, or unusable.

A fourth feature, combinable with any of the previous or following features, the operations further including: for a product for which the wear classification is re-runnable, estimating and providing a life percentage of the product based on calibration specifications; for a product for which the wear classification is repairable, generating an inspection report providing specific details describing repairs to be completed to restore the product to like-new condition; and for a product for which the wear classification is unusable, generating a recycling report identifying specific portions of the product that include materials suitable for one or more of recycling, reclaiming for repair, for testing.

A fifth feature, combinable with any of the previous or following features, the operations further including generating an International Association of Drilling Contractors (IADC) inspection report for the used product, the IADC inspection report based on dull grading standards for drill bits.

A sixth feature, combinable with any of the previous or following features, the operations further including validating a product design and features of the product based on product specification sheets and 3D models specifying a manufacture of the product.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. A product is scanned using multiple scans obtained from different angles relative to the product. A 3D numerical model of the product is generated using feature recognition and the multiple scans. The 3D numerical model of the product is compared to 3D product specification models, where each 3D product specification model numerically defines specifications for a given product in new condition. The 3D numerical model is matched to a matched 3D product specification model. A product type of the product that is scanned is determined based on the matching. A report is generated based on a comparison of the 3D numerical model of the product and the matched 3D product specification model. For a new product that is scanned, the report includes an indication of whether the new product matches design specifications for new products of the product type. For a used product that is scanned, the report includes an indication of a used condition of the used product relative to a new condition of new products of the product type.

The foregoing and other described implementations can each, optionally, include one or more of the following features:

A first feature, combinable with any of the following features, the operations further including determining a product type of a new product by comparing a 3D numerical model of the new product to a 3D numerical model of an existing worn product of a known type.

A second feature, combinable with any of the previous or following features, where the product is a drill bit used for drilling for oil, water, or gas, or when drilling for mines.

A third feature, combinable with any of the previous or following features, the operations further including, for the used product that is scanned: determining that the product is a drill bit; and performing a dull grading of the drill bit to determine a wear classification of the drill bit, where the wear classification is re-runnable, repairable, or unusable.

A fourth feature, combinable with any of the previous or following features, the operations further including: for a product for which the wear classification is re-runnable, estimating and providing a life percentage of the product based on calibration specifications; for a product for which the wear classification is repairable, generating an inspection report providing specific details describing repairs to be completed to restore the product to like-new condition; and for a product for which the wear classification is unusable, generating a recycling report identifying specific portions of the product that include materials suitable for one or more of recycling, reclaiming for repair, for testing.

A fifth feature, combinable with any of the previous or following features, the operations further including generating an International Association of Drilling Contractors (IADC) inspection report for the used product, the IADC inspection report based on dull grading standards for drill bits.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY.

The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:
1. A computer-implemented method, comprising:
  scanning a product using multiple scans, the multiple scans obtained from different angles relative to the product;
  generating, using feature recognition and the multiple scans, a three-dimensional (3D) numerical model of the product;

comparing the 3D numerical model of the product to 3D product specification models, wherein each 3D product specification model numerically defines specifications for a given product in new condition;

matching the 3D numerical model to a matched 3D product specification model;

determining, based on the matching, a product type of the product that is scanned; and generating, based on a comparison of the 3D numerical model of the product and the matched 3D product specification model, a report including:
for a new product that is scanned, an indication of whether the new product matches design specifications for new products of the product type; and
for a used product that is scanned, an indication of a used condition of the used product relative to a new condition of new products of the product type.

2. The computer-implemented method of claim 1, further comprising determining a product type of a new product by comparing a 3D numerical model of the new product to a 3D numerical model of an existing worn product of a known type.

3. The computer-implemented method of claim 1, wherein the product is a drill bit used for drilling for oil, water, or gas, or when drilling for mines.

4. The computer-implemented method of claim 1, further comprising, for the used product that is scanned:
determining that the product is a drill bit; and
performing a dull grading of the drill bit to determine a wear classification of the drill bit, wherein the wear classification is selected from a group comprising re-runnable, repairable, and unusable.

5. The computer-implemented method of claim 4, further comprising:
for a product for which the wear classification is re-runnable, estimating and providing a life percentage of the product based on calibration specifications;
for a product for which the wear classification is repairable, generating an inspection report providing specific details describing repairs to be completed to restore the product to like-new condition; and
for a product for which the wear classification is unusable, generating a recycling report identifying specific portions of the product that include materials suitable for one or more of recycling, reclaiming for repair, for testing.

6. The computer-implemented method of claim 4, further comprising generating an International Association of Drilling Contractors (IADC) inspection report for the used product, the IADC inspection report based on dull grading standards for drill bits.

7. The computer-implemented method of claim 1, further comprising validating a product design and features of the product based on product specification sheets and 3D models specifying a manufacture of the product.

8. A non-transitory, computer-readable medium storing one or more instructions executable by a computer system to perform operations comprising:
scanning a product using multiple scans, the multiple scans obtained from different angles relative to the product;
generating, using feature recognition and the multiple scans, a three-dimensional (3D) numerical model of the product;
comparing the 3D numerical model of the product to 3D product specification models, wherein each 3D product specification model numerically defines specifications for a given product in new condition;
matching the 3D numerical model to a matched 3D product specification model;
determining, based on the matching, a product type of the product that is scanned; and
generating, based on a comparison of the 3D numerical model of the product and the matched 3D product specification model, a report including:
for a new product that is scanned, an indication of whether the new product matches design specifications for new products of the product type; and
for a used product that is scanned, an indication of a used condition of the used product relative to a new condition of new products of the product type.

9. The non-transitory, computer-readable medium of claim 8, the operations further comprising determining a product type of a new product by comparing a 3D numerical model of the new product to a 3D numerical model of an existing worn product of a known type.

10. The non-transitory, computer-readable medium of claim 8, wherein the product is a drill bit used for drilling for oil, water, or gas, or when drilling for mines.

11. The non-transitory, computer-readable medium of claim 8, the operations further comprising, for the used product that is scanned:
determining that the product is a drill bit; and
performing a dull grading of the drill bit to determine a wear classification of the drill bit, wherein the wear classification is selected from a group comprising re-runnable, repairable, and unusable.

12. The non-transitory, computer-readable medium of claim 11, the operations further comprising:
for a product for which the wear classification is re-runnable, estimating and providing a life percentage of the product based on calibration specifications;
for a product for which the wear classification is repairable, generating an inspection report providing specific details describing repairs to be completed to restore the product to like-new condition; and
for a product for which the wear classification is unusable, generating a recycling report identifying specific portions of the product that include materials suitable for one or more of recycling, reclaiming for repair, for testing.

13. The non-transitory, computer-readable medium of claim 11, the operations further comprising generating an International Association of Drilling Contractors (IADC) inspection report for the used product, the IADC inspection report based on dull grading standards for drill bits.

14. The non-transitory, computer-readable medium of claim 8, the operations further comprising validating a product design and features of the product based on product specification sheets and 3D models specifying a manufacture of the product.

15. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
scanning a product using multiple scans, the multiple scans obtained from different angles relative to the product;

generating, using feature recognition and the multiple scans, a three-dimensional (3D) numerical model of the product;

comparing the 3D numerical model of the product to 3D product specification models, wherein each 3D product specification model numerically defines specifications for a given product in new condition;

matching the 3D numerical model to a matched 3D product specification model;

determining, based on the matching, a product type of the product that is scanned; and generating, based on a comparison of the 3D numerical model of the product and the matched 3D product specification model, a report including:

for a new product that is scanned, an indication of whether the new product matches design specifications for new products of the product type; and for a used product that is scanned, an indication of a used condition of the used product relative to a new condition of new products of the product type.

16. The computer-implemented system of claim 15, the operations further comprising determining a product type of a new product by comparing a 3D numerical model of the new product to a 3D numerical model of an existing worn product of a known type.

17. The computer-implemented system of claim 15, wherein the product is a drill bit used for drilling for oil, water, or gas, or when drilling for mines.

18. The computer-implemented system of claim 15, the operations further comprising, for the used product that is scanned:

determining that the product is a drill bit; and performing a dull grading of the drill bit to determine a wear classification of the drill bit, wherein the wear classification is selected from a group comprising re-runnable, repairable, and unusable.

19. The computer-implemented system of claim 18, the operations further comprising:

for a product for which the wear classification is re-runnable, estimating and providing a life percentage of the product based on calibration specifications;

for a product for which the wear classification is repairable, generating an inspection report providing specific details describing repairs to be completed to restore the product to like-new condition; and for a product for which the wear classification is unusable, generating a recycling report identifying specific portions of the product that include materials suitable for one or more of recycling, reclaiming for repair, for testing.

20. The computer-implemented system of claim 18, the operations further comprising generating an International Association of Drilling Contractors (IADC) inspection report for the used product, the IADC inspection report based on dull grading standards for drill bits.

* * * * *